Nov. 15, 1938.                M. J. MARTIN                2,136,660
                                FILTER
                          Filed Aug. 2, 1934              3 Sheets-Sheet 1
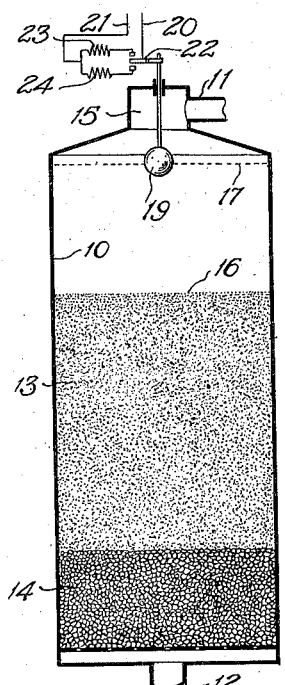
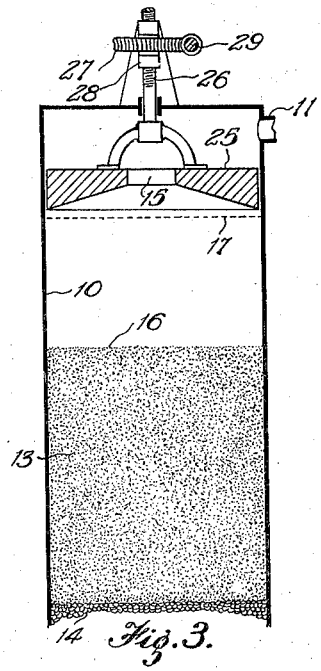
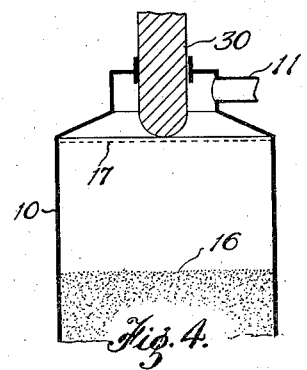
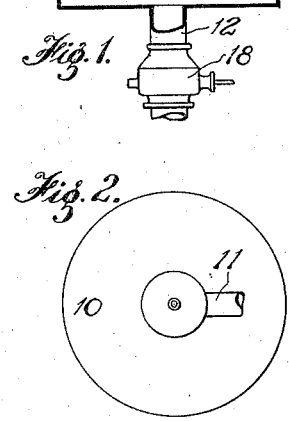
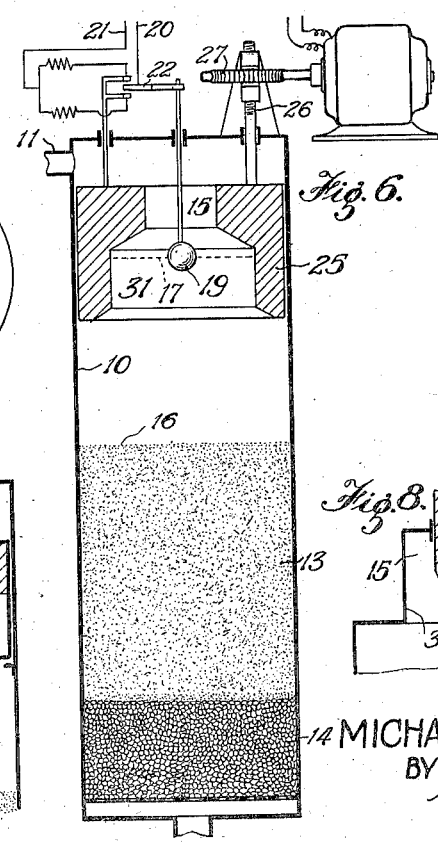
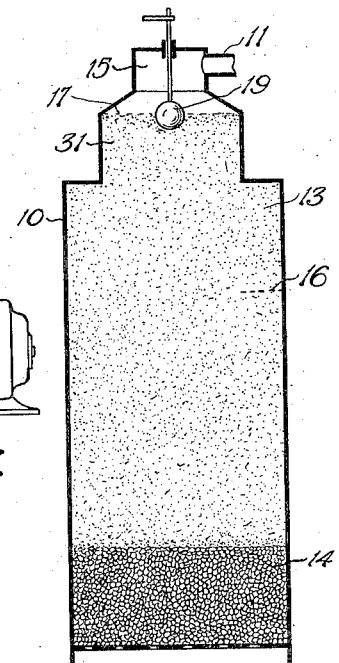
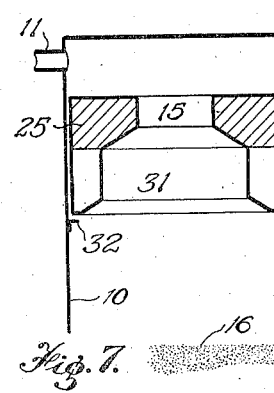
INVENTOR
MICHAEL JAMES MARTIN
BY Haseltine, Lake & Co.
ATTORNEYS Nov. 15, 1938. M. J. MARTIN 2,136,660
FILTER
Filed Aug. 2, 1934 3 Sheets-Sheet 2

INVENTOR
MICHAEL JAMES MARTIN
BY Haseltine, Lake & Co
ATTORNEYS

Nov. 15, 1938.  M. J. MARTIN  2,136,660

FILTER

Filed Aug. 2, 1934  3 Sheets-Sheet 3

INVENTOR
MICHAEL JAMES MARTIN
BY Haseltine, Lake & Co.
ATTORNEYS

Patented Nov. 15, 1938

2,136,660

UNITED STATES PATENT OFFICE 2,136,660

FILTER

Michael James Martin, Armadale, Australia

Application August 2, 1934, Serial No. 738,077
In Australia August 18, 1933

13 Claims. (Cl. 210—144)

This invention relates to improvements in and connected with filters of the kind having a filter bed of sand or like granular material and is applicable both to filters of the gravity and pressure types.

In the filtration of water by means of graded beds of sand and gravel or other suitable comminuted material, it is customary to first coagulate the impurities by treatment with a suitable coagulant and then to cause the water to pass downwards through the filter bed.

The impurities removed from the water form a film of "floc" at the upper surface of the filter bed and on the grains of material forming the upper zone of said bed, and, though this film plays an important part in the filtering operation, it gradually increases the resistance to the flow of water therethrough and consequently must be removed at intervals.

This removal of accumulated impurities is usually effected by a reverse flow of prefiltered wash water and, as it is desired to agitate the filter bed in order to obtain an effective dislodgement and removal of the impurities, the reverse flow of wash water is sometimes accompanied by agitation with air or by means of rakes.

Of recent years, however, it has become a common practice to agitate the bed by employing a high velocity reverse flow of wash water, thus obviating the necessity of employing agitation by air or mechanical means.

With this last mentioned method of cleaning the filter bed, the velocity of the wash water is sufficient to cause at least a partial hydraulic suspension of the granular particles forming the bed which accordingly assumes an expanded condition during the washing or scouring operation. For this purpose the upward velocity of wash water is usually from about 24" to 32" vertical rise per minute. The expression "vertical rise per minute" designates the velocity the wash water would have if the filter bed were not present, the actual velocity between the particles being, of course, much higher.

The wash water—in the case of a gravity or open filter—is usually discharged from the upper end of the filter chamber by means of one or more discharge troughs disposed horizontally about 18" to 24" above the filter bed or by means of one or more discharge openings disposed at the requisite height at one or more sides of the filter chamber.

From this description, it will be understood that, in the case of a gravity filter, the wash water usually flows laterally to a greater or lesser extent above the filter bed when passing to the discharge means.

In the case of filters of the enclosed or pressure type, the collection and discharge of the wash water is usually effected by means of a perforated plate or pipe, but, as far as we are aware, no means have been provided in either this or the gravity type of filter for obtaining a uniform upward flow through the surface of and above the filter bed, though considerable attention has been paid to the problem of obtaining a uniform distribution of wash water below the filter bed.

Now, it has been found that the impurities deposited on the surface of the filter bed—and which it is desired to discharge during the washing operation—consist in part of relatively compact flaky particles the density of which is not much less than that of the sand grains.

I have ascertained that, during the washing of the filter bed by the high velocity method, these flaky particles and certain other foreign materials remain suspended just above the surface of the expanded filter bed and settle on the surface of the bed when the washing operation is completed.

In this connection, it should be noted that, in the case of a filter chamber of uniform or substantially uniform cross-sectional area, the velocity of flow during washing decreases towards the top of the expanded bed where the particles are more widely separated and that a substantial drop in velocity occurs above the expanded bed. This relatively lower velocity above the filter bed is detrimental to the removal of the aforementioned flaky particles of floc and the like.

It is now considered good practice for the wash water to flow at such a high velocity that the individual particles of the filter bed will be effectively scrubbed and with such velocities (about 28" to 32" vertical rise per minute) the volume of the expanded bed is usually about 40% to 50% greater than the volume of the bed during the filtering operation.

It is found that this large expansion of the bed sometimes allows the heavier particles of suspended floc to fall into the bed during the washing operation, thus further serving to prevent their removal.

This disadvantage cannot be satisfactorily overcome by employing a still higher wash water velocity which would serve to carry off and discharge the heavier floc particles because such higher velocity would result in a greater expansion of the filter bed and it has been found that, if the expanded volume is more than about 50% of the compacted volume, the scouring action is less efficient owing to the greater separation of the individual sand particles. In addition, the increased consumption of wash water is a disadvantage.

Now, the object of the present invention is, inter alia, to provide a method of and means whereby the above mentioned disadvantages will be overcome or minimized and the efficiency of the washing operation will be enhanced.

One feature of the invention consists in providing means whereby the velocity of the wash water above the filter bed will be sufficient to carry off the particles of floc or other material which ordinarily remain suspended thereabove.

Another feature of the invention consists in means for increasing the velocity of the wash water in the neighborhood of the upper surface of the initially expanded filter bed in order to produce a regular secondary sand expansion whereby a more effective scouring action will be obtained with a given flow of wash water through the filter bed, and whereby the removal of the said floc particles and other material will be facilitated.

A further feature of the invention resides in the provision of means above the filter bed for ensuring that the wash water passing through the upper portion of the filter bed will be substantially vertical and uniform over the whole area thereof.

A still further feature of the invention resides in the provision of means for providing in the space between the surface of the compacted filter bed and the surface of the expanded bed, a zone of reduced cross-sectional area by means of which the velocity of the wash water through that zone will be greater than the velocity at each side thereof.

More particularly in one form of the invention, we provide one or more substantially vertical passages of reduced area just above the level of the upper surface of the expanded sand bed, whereby the increased velocity through the zone formed by said passage or passages will cause the aforesaid flaky particles and other material (which usually remains in suspension above said bed during the washing operation) to be discharged from the chamber.

It will be clear that, in order to obtain the desired result, it is necessary for the level of the expanded sand to have a fairly definite relationship to the lower ends of the passage or passages and accordingly it is usually necessary to provide means to control either the expansion of the sand bed or the vertical position of said passage or passages in relation thereto. This control may be effected manually, though it is preferably carried out automatically by any known device, such as a float responsive to the expanded-sand level, a thermostat responsive to the temperature of the water, and/or a device responsive to the wash water velocity.

In the case of filter chambers of substantial cross sectional area, we provide a plurality of vertical passages arranged in parallel at regular intervals so as to ensure that the draw-off of water above the filter bed shall be substantially vertical and uniform.

The lower portion of the vertical passage or passages abovementioned are preferably of substantially uniform area for an appreciable length whilst the upper portions of said passages are restricted in area to cause the requisite high velocity for the removal of the flaky particles and the like. With this arrangement the wash water velocity is such as to cause an initial expansion of the sand whereby its upper surface enters the zone of increased velocity due to the lower portions of the passages.

This increased velocity results in an increased or secondary expansion of the sand to a position below the restricted areas at the upper ends of the passages, thus enabling the flaky particles and the like to be drawn off owing to the further increase in velocity whilst, at the same time, preventing loss or any material loss of sand.

This increased sand expansion is advantageous in that it facilitates the removal of the flaky particles and other matter and enables a given degree of expansion to be obtained with a lower velocity of wash water through the filter chamber so that a more effective scouring action is obtained for a given consumption of wash water. The improved scouring action is not confined to the sand grains initially close to the upper surface of the filter bed as it has been found that there is a substantial vertical migration of the sand particles whilst the bed is in suspension and thus sand particles are continually moving into the lower portions of the passages from the filter chamber and vice versa.

Other features of the invention reside in the construction and arrangement of the parts and are set forth in the following detailed description.

Whilst the invention is especially applicable to filters which are cleansed by a high velocity flow of wash water, as above described, it should be recognized that some of the advantages of the invention are applicable to relatively low velocity flows of wash water.

In order to more effectively cleanse a filter bed, it has previously been proposed to adjustably arrange a member transversely above and in proximity to the normal level of a filter bed, this member being provided with upwardly converging passages and with upwardly diverging passages arranged alternately and through which the wash water passes upwardly during the cleansing operation. Thus the water flows upwardly through the said passages in parallel columns of increased and decreased velocity respectively. When the filter bed is expanded by an upward flow of wash water, portion of the filter bed is raised by the aforesaid columns of increased velocity above the member containing the passages, the sand grains being thus subjected to a more intense scrubbing action. The sand grains which are projected above the passage-containing member as above indicated then enter the aforesaid columns of decreased velocity, through which they descend, being thereby returned to a position below the said member.

In contrast to this prior device, the present invention involves subjecting the filter bed to the action of a rising current which is substantially uniform over the whole area of the filter bed. Thus, discontinuity of the upper surface of the expanded filter bed, which results from the existence of adjacent currents of increased and decreased velocity in the prior device, is not a feature of the present invention.

Having set forth the object and nature of the invention, reference will be made to the accompanying drawings which illustrate several preferred forms thereof and in which:—

Figure 1 is a diagrammatic view in vertical section of an enclosed filter chamber in accordance with the invention.

Figure 2 is a view in plan of the filter shown in Figure 1.

Figure 3 is a view similar to Figure 1 showing a filter chamber with an adjustable diaphragm.

Figure 4 is a diagrammatic view in vertical section of the upper portion of an enclosed filter chamber and shows a further modification.

Figure 5 is a diagrammatic view in vertical section of a filter chamber provided at its upper end with a fixed passage for effecting a secondary expansion of the sand bed during washing.

Figure 6 is a view similar to Figure 4 and shows a vertically adjustable passage.

Figure 7 is a diagrammatic view in vertical section of portion of a filter chamber and shows a further form of adjustable passage.

Figure 8 is a view similar to Figure 6 and shows a still further adjustment device.

Figure 9:
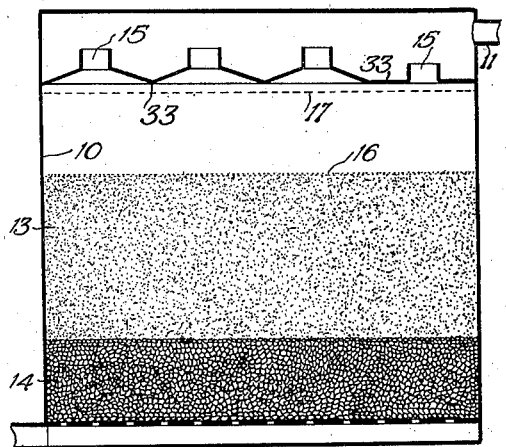
Figure 9 is a diagrammatic view in vertical section of an enclosed filter chamber having a plurality of vertical draw-off passages near its upper end.

In the various figures of the drawings the reference numeral 10 designates a filter chamber provided at its upper end with an inflow passage 11 and at its lower end with an effluent passage 12. The chamber 10 contains a graded bed of suitable comminuted material usually consisting of sand 13 and gravel 14.

During the normal filtering operation water enters the upper end of the chamber through the passage 11, passes downwards through the filter bed and is discharged through the effluent passage 12.

When the filter bed is being washed, prefiltered wash water enters the lower end of the chamber through the passage 12, passes upwardly through the filter bed at a relatively high velocity so as to cause an expansion thereof and is discharged through the passage 11. Though the passages 11 and 12 are described as serving both for normal filtration and for reverse upward flow during washing, it will be clear that separate pipes may be provided for these purposes. In such cases the passages 11 shown at the upper ends of the filter chambers should be regarded as wash water discharge passages as the present invention is concerned primarily with improvements in connection with the washing of filter beds.

Figure 10:
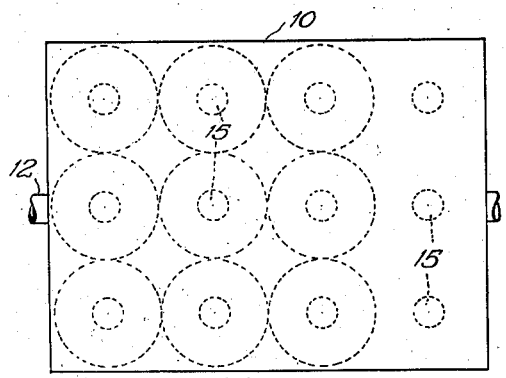
Figure 10 is a view in plan of the filter shown in Figure 9.

Though, with the exception of Figure 10, the drawings illustrate filters of the pressure or enclosed gravity type, it will be understood that the invention is equally applicable to filters of the open gravity type as shown in Figure 10.

Figures 1 and 2 illustrate one elementary form of the invention in which the upper end of the chamber 10, which is of relatively small cross-sectional area, converges towards a narrow central passage 15 with which the passage 11 communicates.

During normal downward filtration when the filter bed is compacted, the upper surface of the sand bed is in the position designated by the reference numeral 16.

When, however, the filter bed is subjected to a high velocity upward flow of wash water, the filter bed is expanded so that the upper surface of the sand is approximately in the position shown by the reference numeral 17. Accordingly this upper surface of the expanded sand bed is disposed just below the zone of increased velocity, occasioned by the converging upper end of the filter chamber 10 and passage 15 thus obviating the discharge of sand from the chamber. On the other hand, the said flaky particles and other foreign matter which normally remains in suspension just above the expanded sand level is disposed in the zone of increased velocity and is carried out of the chamber with the wash water.

It will accordingly be understood that the invention as illustrated in Figure 1 consists not merely in providing a zone of increased velocity but also in so positioning this zone that its lower end will be closely adjacent to the expanded level 17 of the filter bed.

As the degree of expansion of the said bed during washing is dependent on such factors as the size and specific gravity of the sand particles and the temperature and upward velocity of the wash water, it is usually necessary to provide suitable means for regulating the velocity of the water to ensure that the level of the upper surface of the expanded bed will be disposed in an appropriate position with respect to the zone of increased velocity.

Accordingly a suitable control valve 18 may be fitted to the passage 12 as shown (or to the wash water discharge passage 11). This valve 18 may be controlled manually for which purpose a suitable inspection window (not shown) may be fitted to an upper portion of the filter chamber but preferably it is controlled automatically by any known means responsive to variations in one or more of the conditions referred to above.

For example, as shown in Figure 1, a float 19 may be arranged to respond to the level of the expanded sand and cause the valve 18 to open or close to a greater or lesser extent as required to maintain a constant predetermined level. Such control means do not form part of the present invention and will, therefore, not be described in detail as many different known arrangements may be employed for the purpose. However, in explanation of the diagram in Figure 1 it may be stated that 20 and 21 designate line conductors of an electric circuit the former being connected to a contact 22 on the float rod and the latter being connected to a pair of motor reversing relays 23 and 24 arranged in parallel and connected at their opposite ends to contacts disposed at each side of the contact 22.

Relays 23 and 24 serve to control the energization in opposite directions of an electric motor (not shown) for actuating the valve 18.

As one alternative, a photo-electric cell apparatus responsive to the comparative opacity of the upper portion of the expanded filter bed may be employed to control a regulating valve as 18.

In lieu of providing means for maintaining a relatively constant degree of sand expansion during the washing of the filter bed the zone of increased velocity may be adjusted to correspond with variations in the level of the expanded bed.

Such an arrangement is illustrated in Figure 3 in which the restricted passage is provided in a diaphragm 25 arranged for vertical adjustment within the filter chamber. The adjustment of the diaphragm may be effected either manually or automatically as by any of the means previously referred to.

In the construction shown in Figure 3, the diaphragm 25 is supported from the lower end of a vertical screwed shaft 26 which extends through a gland in the top of the filter chamber. This screwed shaft is fitted with a nut in the form of a worm wheel 27 which is restrained against vertical movement by a bracket 28. The worm wheel 27 is in mesh with a worm 29 on a spindle adapted to be rotated in either direction by any suitable means to cause the diaphragm to be raised or lowered as required.

Figure 4 shows a modification in which, in lieu of an adjustable diaphragm as 25 a central displacement member 30 is provided. This displacement member is capable of being raised and lowered to regulate the position of the annular zone of increased velocity formed thereby.

It will be clear that the upper end of the filter chamber may be similarly shaped to provide an annular zone of increased velocity even when the central member as 30 is not adjustable.

Figure 5 diagrammatically illustrates another form of the invention in which the upper end of the filter chamber is provided centrally with a vertical passage 31 the upper end of which converges into a passage as 15 previously described.

The area of the passage 31 is substantially smaller than that of the filter chamber and is substantially greater than that of the passage 15.

When the filter bed is expanded by a high velocity upward wash, the upper surface thereof is initially brought into the zone of increased velocity due to the passage 15. As a result of this increased velocity, a secondary expansion of the sand is produced whereby the upper level thereof is disposed (as shown) just below the zone of still further increased velocity due to the passage 15. It will be clear, therefore, that the length of the passage 31 is sufficient to permit of the secondary expansion of the sand without allowing same to enter the zone of the passage 15.

It has been found desirable, though not essential, for the area of the passage 31 to be approximately half the area of the filter chamber and though it is preferred that the said passage 31 be of uniform area from end to end, it will be understood that this is not essential.

The flaky particles and other foreign materials which are carried upwards just above the upper surface of the expanded sand bed enter the high velocity zone of passage 15 and are thereby removed.

The removal of these foreign particles is facilitated by the passage 31 because, owing to the decrease in area from that of the filter chamber, these particles are more concentrated and form a layer of greater depth in the passage 31 than in the filter chamber.

As in the case of the construction shown in Figure 1, the expansion of the filter bed may be controlled either manually or automatically as by means of a float.

Figure 6 shows a construction similar to that of Figure 3 and in which a diaphragm 25 provided with the passages 15 and 31 is arranged movably within the filter chamber whereby it may be adjusted to correspond to variations in the expanded sand level.

This figure diagrammatically illustrates means for automatically adjusting the diaphragm and such means which do not form essential parts of the present invention will be sufficiently understood from the descriptions of Figures 1 and 2.

Figure 7 shows a modification in which the diaphragm 25 is in the form of a float which, similarly to the float 19 in Figures 1 and 6, is responsive to the level of the expanded filter bed.

If desired, portion of the weight of the float may be balanced in any suitable way and stops 32 may be provided to limit the downward movement of said float during downward filtration.

Figure 8 shows a further modification similar to that of Figure 4 in which the zone of increased velocity at the upper end of the passage 31 is adjustable by means of a displacement member 30.

Figures 9 and 10 diagrammatically illustrate a vertical section through a filter chamber of relatively large area and having a partition 33 extending horizontally thereacross to a position just above the surface of the expanded sand bed.

This partition or diaphragm is fitted with a plurality of vertical passages 15 which may be of inverted funnel shape as shown at the left of the figure or they may be plain as indicated at the right of the figure.

These vertical passages are evenly spaced over the area of the filter chamber so as to ensure that the draw-off above the filter bed will be substantially vertical and uniform.

Figure 11:
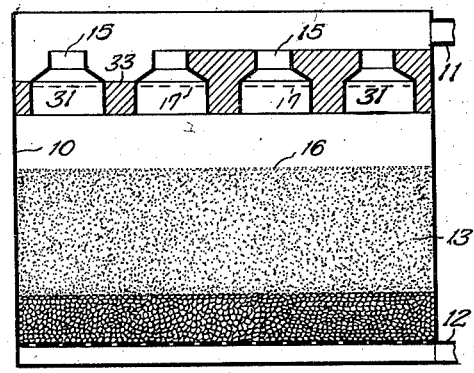
Figure 11 is a view similar to Figure 9 in which the passages are so shaped as to cause a secondary sand expansion.

Figure 11 shows a construction similar to Figure 9 except that, as in the construction shown in Figure 5, the lower ends of the vertical passages (which may be of any suitable shape in cross section) have parallel portions 31 of larger diameter than the portions 15 to permit of a secondary expansion of the sand bed.

The diaphragm 33 containing these vertical passages may be in the form of a concrete slab extending the full height of such passages as shown at the right of Figure 11, or alternatively the passages may extend above the slab as shown at the left of the figure, and also in Figure 9. This latter arrangement has the advantage that in normal downward filtration when the raw water is supplied to the chamber above the diaphragm and passes downwardly through the passages at a low velocity, the upper portion of the chamber serves as a settling chamber in that material in suspension may settle on the top of the slab below the upper ends of the vertical passages. Such material is thus prevented from entering the lower portion of the filter chamber and thus reduces the work of the filter bed.

Figure 12:
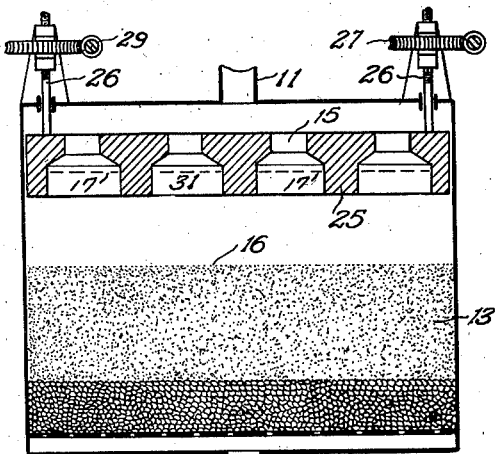
Figure 12 is a view similar to Figure 11 but in which the passages are vertically adjustable.

Figure 12 shows a construction similar to Figure 11 except that the diaphragm 25 containing the vertical passages is adjustable by any suitable means though it will be understood that a float type of diaphragm as indicated in Figure 7 may be used in lieu thereof.

Figure 13:
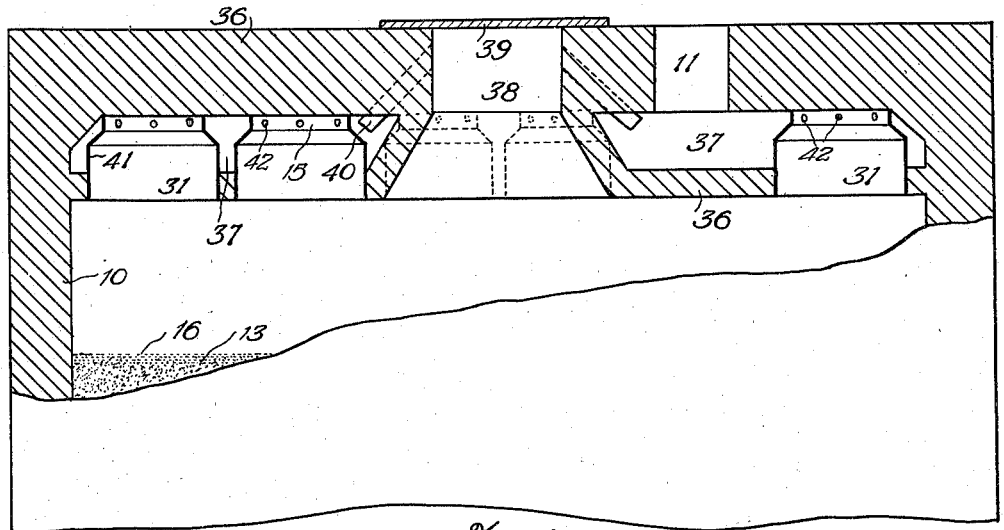
Figure 13 is a view in vertical section through a filter chamber showing a further form of the invention.
Figure 14:
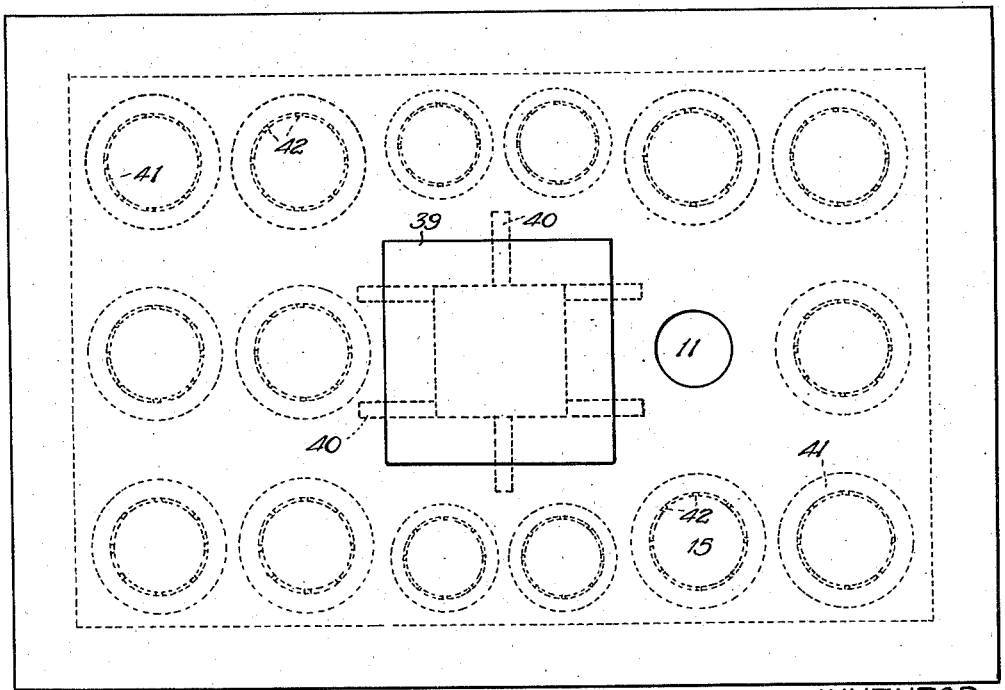
Figure 14 is a view in plan of the filter shown in Figure 13.

Figures 13 and 14 show a further form of the invention in which the top of a filter chamber of the enclosed gravity type is formed of a slab 36 as of concrete having a central horizontal passage 37 therein communicating with the common raw water inlet and wash water discharge passage 11.

A manhole 38 having a cover 39 at its upper end provides for access to the chamber and a plurality of downwardly inclined pipes 40 having their upper ends communicating with the constricted portion of the manhole have their lower ends in communication with the central passage 37 in the slab.

A plurality of cone members 41 are embedded in the slab 36, said members being shaped in the manner previously described to provide lower passages 31 and upper constricted passages 15.

The constricted portion 15 of each cone member is provided with a plurality of lateral holes 42 which communicate with the space 37 in the slab.

During normal operation water enters the space 37 in the slab through the passage 11 and thence passes through the holes 42 and pipes 40 into the passages 15 and the manhole respectively. As the velocity of the water through the space 37 is slow, said space acts as a settling chamber.

When the filter bed is being washed, the sand is initially expanded until it reaches the lower ends of the cones 41 and manhole so that a secondary expansion then takes place.

Flaky floc particles and other like foreign materials are thus brought into the zones of increased velocity caused by the constricted upper portions of the cones and are discharged through the holes 42 into the space 37. The holes provide sufficient resistance to ensure a uniform draw-off over the area of the filter.

Likewise the upper surface of that portion of the expanded bed located within the manhole is disposed within the lower part of the parallel-sided upper portion of said manhole immediately below the upper ends of the pipes 40 which form a zone of increased velocity by means of which particles disposed above the sand surface are discharged into the space 37.

It will be understood that, in order to minimize lateral movement of the water above the expanded bed, the cones 41 should be relatively small in cross section and as closely spaced as is practicable.

In the arrangement shown in Figure 15 a diaphragm 43 is arranged transversely within the chamber 10 and is disposed above the normal surface 16 of the filter bed and below the surface 17 of the bed when same is expanded by the reverse high velocity wash.

This diaphragm is formed with a series of vertical holes 44 of double cone shape which are evenly spaced over the area of the filter chamber.

When the high velocity wash commences the upper surface of the sand bed rises and when it reaches the diaphragm 43 the increase in the velocity due to the restricted openings therein causes the sand grains during their passage therethrough to be subjected to a more intense scouring action. Above the diaphragm the velocity again decreases. When the wash is ceasing the level of the expanded bed falls and the sand passes downwards through the flared upper ends of the passages 44 to its normal filtering condition.

In order to prevent lodgment of sand above the diaphragm 43 the flared upper ends of the passages 44 therein are preferably of square or polygonal shape whereby they may cover the whole area of the filter chamber.

Figure 15:
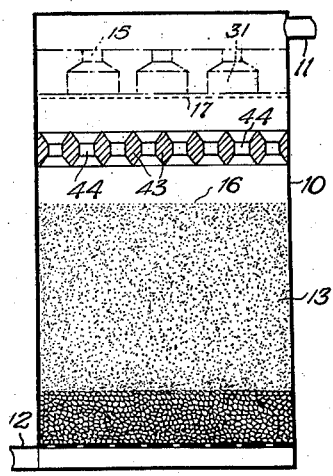
Figure 15 is a diagrammatic view in vertical section of an enclosed filter chamber having means disposed below the level of the expanded filter bed for causing an enhanced scouring action during washing.

If desired, vertical draw-off passages of the types previously described, may be arranged above the surface 17 of the expanded bed, one such arrangement being indicated by broken lines in the Figure 15, though it will be understood that sand scouring means of the kind shown in the figure may be employed independently of any such draw-off passages.

Figure 16:
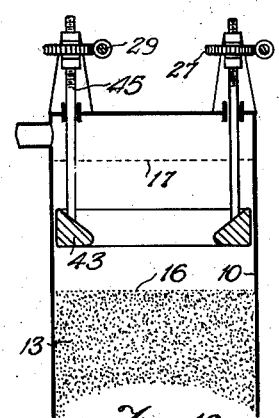
Figure 16 is a diagrammatic view showing a modification of the construction illustrated in Figure 15.

If desired, the diaphragm 43 may be vertically adjustable either manually or automatically, one suitable arrangement being shown in Figure 16 in which the diaphragm comprises an annular ring with a single constricted orifice and is supported by means of screwed shafts 45 actuable in the manner previously described.

Figure 17:
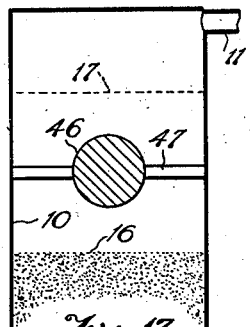
Figure 17 is a view similar to Figure 16 and shows a further modification.

A further alternative arrangement is shown in Figure 17 in which the constriction is of annular shape and is formed by a central displacement member 46 supported by arms 47.

If desired, any or all of the draw-off passages 15 and 31 and the sand scouring passages 44 may be provided with suitable projections preferably in the form of helical vanes, to cause the water passing therethrough to have a rotary movement imparted thereto.

In the appended claims, wherever the velocity of the wash water above the filter bed is compared with the velocity through said filter bed, or when the velocity of the wash water through one section of zone of the bed is compared with the velocity through another section or zone thereof, the velocity through said bed or at different sections or zones thereof is intended to be considered on the basis of rise in inches per minute—that is to say, not as the actual velocity through the interstices between the grains forming the bed but as the velocity which would prevail if the filter bed were removed.

In this connection, it may be repeated that, with a filter chamber of uniform cross-sectional area, the actual velocity of the wash water decreases as the water passes upwardly through the filter bed and is further decreased as the water emerges from the top of the filter bed though the velocity expressed in rise in inches per minute is the same within and above the filter bed.

Therefore, a contraction of the cross-sectional area of the filter chamber above the surface of the expanded filter bed causes an increase in the actual velocity within the contracted space and also an increase in the velocity when expressed in the rise in inches per minute.

I claim:

1. The method of washing a filter bed by an upward flow of wash water sufficient to cause an expansion of the filter bed, comprising increasing the velocity of the wash water adjacent the position to which said bed would normally expand, whereby secondary expansion of said bed takes place, and further increasing the velocity of the water immediately above the level of the finally expanded bed whereby particles thereabove will be disposed in the zone of increased velocity and will thus be removed from the filter.

2. In a filter, a filter chamber having a filter bed of granular material therein and adapted to be cleansed by an upward flow of wash water, means disposed above the filter bed having a plurality of substantially vertical draw-off passages arranged side by side therein, said passages being substantially parallel sided near their upper ends and being open at their lower ends, so as to allow a portion of the filter bed to freely enter same, the aggregate cross-sectional area of said passages being substantially less than the area of the filter bed, the lower ends of the passages being disposed above but in proximity to the normal level of the filter bed so as to cause a secondary expansion of said bed when the same is being cleansed, distance of the means having the passages from the top of the filter bed being sufficiently small and the height of the passages therein being sufficiently great to allow the upper surface of the finally expanded bed to rise so as to come into contact with said means and cause portions of said top to tend to extend up into said passages, and constricting means disposed at the upper ends of said passages to cause a still further increase in the velocity of the wash water above the surface of the finally expanded bed.

3. In a filter, a filter chamber having a filter bed therein, means disposed transversely above the filter bed and having a plurality of substantially vertical passages therein spaced substantially uniformly over the area of the filter chamber, the cross sectional area of the upper end of each passage not substantially exceeding the cross-sectional area of the lower end thereof and the aggregrate cross-sectional area of said passages being substantially less than the cross-sectional area of the filter bed, so that when a current of wash water is passed upwardly through a filter chamber, the velocity of substantially the entire body thereof is increased in said passages, the lower ends of said passages being disposed immediately above the upper surface of the filter bed when the same is expanded during the washing operation.

4. In a filter, a filter bed at least one substantially vertical passage constituting a zone of increased velocity for substantially the entire body of wash water, of which zone the cross-sectional area is substantially less than the area of the filter bed and the lower end of said zone being disposed above, and in proximity to, the normal level of the upper surface of the filter bed, so that when the filter bed is initially expanded by an upward flow of wash water, the increased velocity occasioned by said zone will cause a secondary expansion of the filter bed, the distance of the means containing the passage from the top of the filter bed being sufficiently small and the vertical height of the zone being sufficiently great to allow the upper surface of the finally expanded bed to rise so as to cause portions of said top to tend to extend up into said zone, the same and each substantially vertical passage being substantially parallel-sided near its upper end.

5. In a filter having a filter chamber provided with a filter bed, a diaphragm adapted to be arranged transversely within the filter chamber above the filter bed therein, said diaphragm having one or more substantially vertical passages therein which together form a predetermined zone, of which the cross-sectional area is substantially less than the area of the filter bed and in which substantially the entire body of wash water will be automatically subjected to increased velocity, each of said passages being open at its lower end to permit a portion of the filter bed to freely enter same, each of said passages being of substantially uniform cross sectional area and of sufficient length to permit of a secondary expansion of the filter bed occurring therein, and constricting means disposed at the upper end of each of said passages to cause a still further increase in the velocity of the wash water.

6. In a filter, a filter bed disposed within a filter chamber, means transversely disposed within said filter chamber and pierced by therein, with a plurality of substantially vertical passages spaced over the area of the filter chamber said substantially vertical passage being disposed above the normal level of said filter bed, and being open at their lower ends to permit portion of the filter bed to freely enter same, and the aggregate cross-sectional area of said passages being substantially less than the area of the filter chamber and said passages having their lower ends positioned in proximity to the normal level of the upper surface of the filter bed, so that, when the latter bed is initially expanded by an upward flow of wash water, the increased velocity occasioned by said passages will cause a secondary expansion of said bed, the distance of the transversely disposed means from the surface of the filter bed being sufficiently small and the vertical length of the passages therein being sufficiently great to allow portions of the upper surface of the finally expanded bed to rise so as to come into contact with said transversely disposed means and cause portions of said surface to tend to extend up into said passages and the cross-sectional area of said passages being substantially uniform for the major portion of the length thereof.

7. A diaphragm adapted to be arranged transversely within a filter chamber above the filter bed therein and one or more substantially vertical passages in said diaphragm for the passage of an upward flow of wash water, each of which passages has a constricted portion at its upper end and of which the lower portion has a sufficient length to permit of a secondary expansion of the filter bed.

8. In a filter, a filter chamber having a filter bed therein a cover member arranged above the filter bed and having a central horizontal cavity therein, means for supplying raw water to and for discharging wash water from, the cavity, a plurality of vertical passages in the cover member and having their lower ends communicating with the filter chamber above the filter bed therein, said passages being substantially parallel-sided for an appreciable length and having an aggregate area substantially less than the area of the filter chamber, constricted portions near the upper ends of said vertical passages and lateral passages connecting the upper constricted portions of the vertical passages with the cavity in the cover member.

9. A filter according to claim 8 wherein the lateral passages connecting the upper constricted portions of the vertical passages with the said cavity are disposed near the top of the cavity whereby the latter will serve as a settling chamber.

10. The method of washing a filter bed by an upward flow of wash water sufficient to cause an expansion of the bed, comprising increasing the velocity of the entire body of wash water in a zone disposed above the normal level of the upper surface of the bed and extending below the upper surface thereof when same is expanded during washing.

11. In a filter, a filter chamber having a filter bed therein adapted to be expanded when subjected to an upward flow of wash water, a float member responsive to the level of the expanded filter bed and at lease one substantially vertical passage in said float member and forming a zone of increased velocity for the wash water the cross-sectional area of said zone of increased velocity being substantially less than the area of the filter bed said float member serving to maintain the zone of increased velocity in predetermined relationship with the upper surface of the filter bed when the latter is expanded by an upward flow of wash water.

12. In a filter, a filter chamber having a filter bed therein, a diaphragm arranged transversely within the filter chamber above the filter bed, at least one tubular member extending above the diaphragm and forming a zone of substantially uniformly increased velocity for substantially the entire body of wash water, the cross-sectional area of said zone being substantially less than the area of the filter bed, and the upper end of said zone being disposed above the position occupied by the upper surface of the filter bed when the latter is expanded by an upward flow of wash water and means for introducing the water to be filtered above said diaphragm whereby the space there above will serve as a settling chamber.

13. The method of washing a filter bed of practically uniform transverse sectional area and formed of granular material, which in combination, consists in passing wash water upwardly through the bed at a velocity sufficient to cause an expansion thereof and thereby raise the upper surface of said bed above its normal position while maintaining the cross sectional area of the bed constant, increasing the velocity of the wash water above said normal level of the bed by reducing the total effective cross sectional area of the wash water to less than the cross sectional area of the bed and in such proximity to said normal level as to cause a secondary expansion of the said bed due to the increased velocity, and by further reducing the total effective cross sectional area of the wash water above the level of the first area reduction, and causing such increase in velocity to be substantially uniform over the total cross-sectional area of the filter bed to be maintained through a vertical distance of sufficient magnitude to maintain the upper surface of said finally expanded bed stable and subject the same to said increased velocity of flow of wash water.

MICHAEL JAMES MARTIN.